E. E. BAILEY.
CHALK LINE SPOOL.
APPLICATION FILED JULY 21, 1913.
1,170,392.
Patented Feb. 1, 1916.
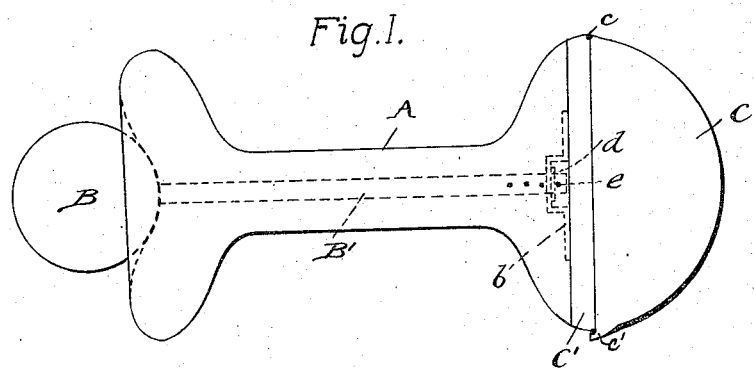
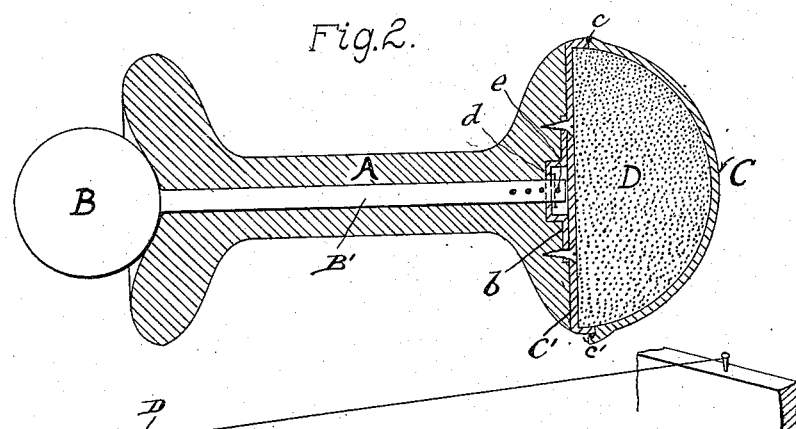
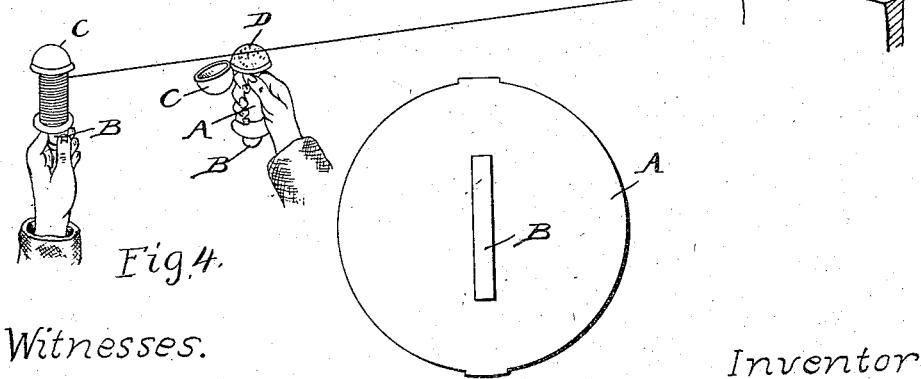
Witnesses.
Elmer E. Wyckoff.
Charles M. Mercer.
Fig. 3.
Inventor.
Edwin E. Bailey

UNITED STATES PATENT OFFICE.

EDWIN E. BAILEY, OF ROCHESTER, NEW YORK.

CHALK-LINE SPOOL.

1,170,392.

Specification of Letters Patent.

Patented Feb. 1, 1916.

Application filed July 21, 1913. Serial No. 780,414.

*To all whom it may concern:*

Be it known that I, EDWIN E. BAILEY, a citizen of the United States, residing at Rochester, in the county of Monroe and State of New York, have invented a new and useful Chalk-Line Spool, of which the following is a specification.

My invention is an improvement in spools or rotary holders for chalk lines, which are used by carpenters.

The invention is embodied in the construction and combination of parts hereinafter described and claimed, reference being had to the accompanying drawing in which—

Figure 1 is a plan view of the device. Fig. 2 is a longitudinal section of the same. Fig. 3 is an end view. Fig. 4 is a view illustrating the manner of using the device.

In the several figures of the drawing, A indicates the body of the spool upon which, in practice, a chalk-line is wound. The spool A has flanged ends or heads as usual in this class of devices, and it is provided with a longitudinal bore to receive the axis or shaft B' upon which the spool is adapted to rotate. The inner end of this axis passes through a metal keeper b and is secured thereto by a washer d and cotter-pin e.

The outer end B of the axis is a large disk which serves as a handle or means for holding or supporting the spool proper when a chalk-line is being wound on or drawn off from the latter; that is to say, the disk may be held between the thumb and finger with one hand, as shown in Fig. 4, while the other hand draws off the line. The free end of the line may in such case be attached to a nail or screw and inserted in a fixed object and then the person holding the disk between the thumb and finger walks away from said object, at the same time drawing a piece of chalk over the line as it unwinds from the spool.

The disk may be clamped in the jaws of a vise instead of being held manually, when it is desired to wind on or draw off a line. The outer end of the spool proper A is recessed or provided with a central cavity which receives or accommodates a portion of the disk B, as shown in Figs. 1 and 2, which reduces the length of the device as a whole without affecting the function of the disk.

To the end of the spool A, which is opposite the disk handle b, I apply a metal chalk-holder consisting of a flat plate C', and a hollow hemispherical or cup-shaped cover C, which is hinged to said plate at c and provided with a spring catch c' on the opposite side. A solid hemispherical piece of chalk D is held in this device and is thus always ready for use. At the same time it is fully protected from contact with other objects while the cover is closed. It will be noted that the same screws which secure this chalk holder in place also pass through and secure the keeper or shaft bearing b before referred to.

What I claim is:—

The improved chalk-line holder comprising a flanged spool having a chalk-holder proper secured to one end, a central shaft on which the spool is mounted and secured rotatably, said shaft having one end constructed as an enlarged disk, as and for the purpose specified.

EDWIN E. BAILEY.

Witnesses:
ELMER E. WYCKOFF,
CHARLES M. MERCER.

Copies of this patent may be obtained for five cents each, by addressing the "Commissioner of Patents, Washington, D. C."